Dec. 29, 1931.  W. J. COULTAS  1,838,744

CORN HARVESTER

Filed Jan. 24, 1930

INVENTOR
Wilbur J. Coultas
BY
Brown, Jackson, Boettcher & Dienner
ATTORNEYS

WITNESS
Walter Ackerman

Patented Dec. 29, 1931

1,838,744

UNITED STATES PATENT OFFICE

WILBUR J. COULTAS, OF MOLINE, ILLINOIS, ASSIGNOR TO DEERE & COMPANY, OF MOLINE, ILLINOIS, A CORPORATION OF ILLINOIS

CORN HARVESTER

Application filed January 24, 1930. Serial No. 423,076.

The present invention relates to corn harvesters, and is primarily concerned with the frame structure which supports the snapping rolls, gathering chains and points comprising the gathering and picking mechanism.

The principal object of the invention is to provide an improved frame structure and cooperating bracing and adjusting means for the inner gathering mechanism comprising the inner snapping roll, gathering point, etc. By the provision of this adjustable bracing means the inner snapping roll may be adjusted inwardly or outwardly relatively to the outer snapping roll to conform to the condition of the crop, wear of the parts, or other like requirements. In its more specific details, this invention may be regarded as an improvement upon the frame structure for the gathering and picking mechanism of the corn harvester disclosed in the copending application of myself and Norman F. Andrews, Serial No. 395,510, filed September 27, 1929.

Figure 1:
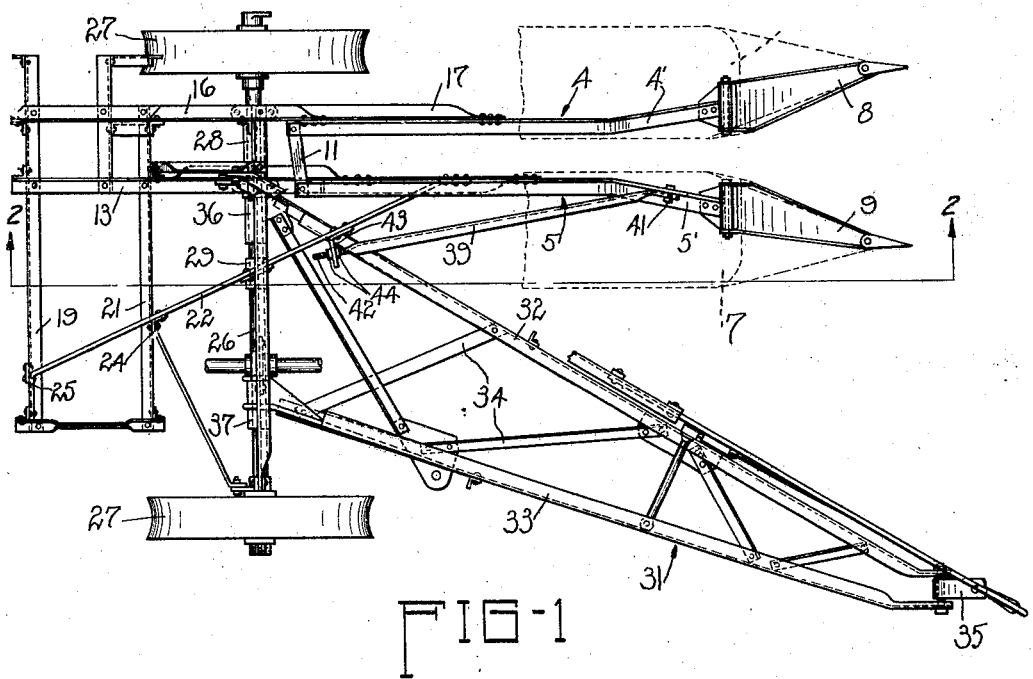
Figure 2:
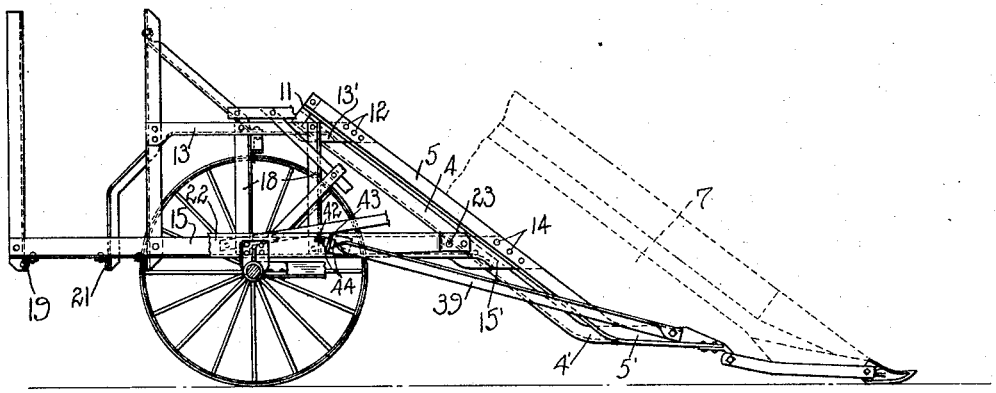

Referring to the accompanying drawings wherein I have illustrated a preferred embodiment of my invention:

Figure 1 is a plan view of the harvester frame and some of the associated parts; and Figure 2 is a longitudinal sectional view of the same taken approximately on the plane of the line 2—2 of Figure 1.

The gathering and picking mechanism is supported mainly on two substantially parallel, longitudinally extending frame structures, each designated 4 and 5 in its entirety. The frame structure 4 supports the outer unit of such mechanism, comprising the outer snapping roll, outer gathering chain, and the elevator which conveys the snapped ears up to the husking mechanism. Such outer unit of the gathering and picking mechanism is diagrammatically represented by the dotted outline of the housing 6 which partially encloses these parts. Likewise, the inner frame structure 5 supports the inner unit of such mechanism, comprising the inner snapping roll and inner gathering chain, such inner unit being also represented by the dotted outline of the housing 7 enclosing such parts. One preferred construction and arrangement of these snapping rolls, gathering chains, etc., is disclosed in the above mentioned copending application, Serial No. 395,510. The outer and inner frame structures 4 and 5 are also adapted to support gathering points 8 and 9 which are pivotally connected with said frame structures to have the forward ends of said points slide along on the ground.

As shown in Figure 2, the frame structures 4 and 5, preferably in the form of angle bars, extend for their greater length in an upwardly and rearwardly direction to support the snapping rolls at the proper angle, with the forward portions of these angle bars bent approximately horizontally, as indicated at 4' and 5'. The upwardly inclined portion of the inner bar 5 is usually placed at a slightly higher elevation than the corresponding portion of the outer bar 4. The rear ends of said bars are preferably connected by a cross brace 11. These inclined upper portions of the bars 4, 5 are rigidly secured to the main frame of the vehicle. The upper end of the inner bar 5 is riveted or bolted at 12 to the widened front end 13' of a substantially horizontal frame bar 13, and the intermediate portion of this inner bar 5 is also riveted or bolted at 14 to the similarly widened portion of a lower, substantially horizontal, frame bar 15. The outer inclined bar 4 is similarly secured to an upper frame bar 16 and to a lower frame bar 17. Both pairs of upper and lower frame bars just mentioned are connected by vertical bars 18.

Secured to the lower bars or rails 15 and 17 are transversely extending bars 19 and 21 forming the rear portion of the frame on which is mounted the husking mechanism. The latter portion of the frame is connected through a diagonal brace bar 22 with the forward end of the inner, lower frame bar 15. The front end of said diagonal brace bar is secured at 23 to the bar 15, and the rear portion of the brace is secured at 24 to the bar 21 and at 25 to the bar 19. This main frame structure is supported on an axle 26 on which are mounted the supporting wheels 27. The longitudinally extending lower frame bars 15 and 17 are secured to a sleeve 28 which is mounted on the axle, and the diagonal brace bar 22 is also secured to a sleeve 29 mounted on the axle.

Draft is transmitted to the implement through a diagonal draft frame structure 31 comprising rearwardly diverging bars 32 and 33 suitably connected by diagonal reenforcing bars 34. The forward ends of the bars 32 and 33 connect with a hitch member 35, and the rear ends of said bars are secured to sleeves 36 and 37 which are rotatably mounted on the axle 26. Such sleeve mounting of the main frame on the axle, and sleeve connection of the draft frame with the axle, permit the implement frame to be tilted about the wheel axis, as for raising or lowering the front ends of the gathering mechanism, without raising or lowering the draft connection.

This has been illustrated and described in the above mentioned copending application of myself and Norman F. Andrews, to which attention is also directed for details of the mounting of the husking mechanism and other operating parts upon the main frame structure.

The portion of the inner frame extension bar 5, lying below its point of attachment 14 to the main frame, can be flexed inwardly or outwardly to change its spacing with respect to the outer frame extension 4. This enables the inner gathering mechanism mounted on such inner frame extension 5, to be adjusted laterally relatively to the outer gathering mechanism, as for the purpose of bringing the two snapping rolls closer together or further apart to accommodate crop conditions, manufacturing discrepancies in the implement, etc. To this end I have provided an adjustable strut or brace 39 extending between the forward portion 5' of said frame extension and a rearward point of the main frame. The front end of said brace is secured to the extension portion 5' preferably by bolting or riveting the brace to the vertically extending flange of the angle bar 5 at 41. The brace 39 is also preferably constructed of a length of angle bar. Carried at the rear end of said brace is a threaded portion 42, which is either secured to the brace or formed integral therewith. This threaded portion passes through an apertured guide bracket 43 which is rigidly secured to the diagonal brace bar 22. Nuts 44 screw over this threaded portion 42 and engage against opposite sides of the bracket 43.

It will be evident that when these two nuts are tightened against opposite sides of the bracket the brace 39 functions as a rigid tie for preventing the frame extension 5 from being deflected either inwardly or outwardly with respect to the outer frame extension 4. It will also be seen that by backing one of these nuts away from the bracket and screwing the other toward the bracket the brace 39 may be placed under tension or compression for either drawing the frame extension 5 inwardly away from the companion extension 4, or forcing it outwardly toward such companion extension. It will thus be seen that by the present invention I have provided improved means which functions as a brace for holding the inner frame extension 5 against lateral deflection in either direction, and which also functions as an adjustment for moving such frame extension toward or away from the outer frame extension 4.

I claim:

1. In a corn harvester, the combination of a main frame comprising substantially horizontal frame bars, inner and outer extension frame bars secured to the front portions of said substantially horizontal frame bars and inclined downwardly and forwardly relatively thereto, said extension frame bars being of right angle cross section and being adapted to support the inner and outer snapping rolls, horizontal diagonal means for rigidly connecting and supporting one of said horizontal frame bars substantially at the point of connection of said inner extension frame bar therewith, the forward portion of said inner extension frame bar extending beyond the point of connection of said bar with said substantially horizontal frame bar, and adjustable means connecting the forward portion of said inner extension frame bar with said diagonal supporting means for adjusting the forward portion of said inner extension frame bar laterally toward or away from said outer extension frame bar.

2. In a corn harvester for harvesting corn one row at a time, the combination of a main frame comprising substantially horizontal frame bars, inner and outer extension frame bars rigidly secured to said horizontal frame bars and inclined downwardly and forwardly relatively thereto and being adapted to support the inner an outer snapping rolls, diagonal means rigidly supporting one of said horizontal frame bars and extending forward substantially to the point of connection of said inner extension bar with said latter horizontal frame bar and substantially supporting said connection against movement, and adjustable means connecting the forward portion of said inner extension frame bar with said diagonal means for laterally adjusting the inner extension frame bar toward or away from said outer extension frame bar, whereby said adjustments cause lateral movement of said inner extension frame bar substantially only from the point of connection thereof with said horizontal frame bar to the forward end thereof.

In witness whereof, I hereunto subscribe my name this 20 day of January, 1930.

WILBUR J. COULTAS.